United States Patent
Van Beresteijn et al.

(10) Patent No.: US 6,451,552 B1
(45) Date of Patent: Sep. 17, 2002

(54) METHOD FOR THE SELECTIVE DEGRADATION OF MILK PROTEIN IN THE PRESENCE OF OTHER MILK PROTEINS

(75) Inventors: Emmerentia Catharine Henriëtte Van Beresteijn; Aart Cornelis Alting, both of Ede (NL)

(73) Assignee: Nederlands Instituut voor Zuivelonderzoek (NL)

( * ) Notice: Subject to any disclaimer, the term of this patent is extended or adjusted under 35 U.S.C. 154(b) by 0 days.

(21) Appl. No.: 09/341,785

(22) PCT Filed: Jan. 16, 1998

(86) PCT No.: PCT/NL98/00025

§ 371 (c)(1),
(2), (4) Date: Aug. 26, 1999

(87) PCT Pub. No.: WO98/31239

PCT Pub. Date: Jul. 23, 1998

(30) Foreign Application Priority Data

Jan. 17, 1997 (NL) ............................................. 1005037

(51) Int. Cl.$^7$ ............................................. C12P 21/06
(52) U.S. Cl. ..................................... 435/68.1
(58) Field of Search ........................................ 435/68.1

(56) References Cited

U.S. PATENT DOCUMENTS

| | | | |
|---|---|---|---|
| 5,112,812 A | * | 5/1992 | Samuelsson et al. |
| 5,451,412 A | * | 9/1995 | Bounous et al. |

FOREIGN PATENT DOCUMENTS

| | | | |
|---|---|---|---|
| EP | 226221 A1 | * | 6/1987 |
| EP | 0250502 | | 1/1988 |
| EP | 0250501 | | 2/1991 |
| EP | 415470 A2 | * | 3/1991 |
| EP | 421309 A2 | * | 4/1991 |
| EP | 522203 A1 | * | 1/1993 |
| EP | 601802 A1 | * | 6/1994 |
| EP | 631731 A1 | * | 1/1995 |
| JP | 06261691 A | * | 9/1994 |
| JP | 07203844 A | * | 8/1995 |
| JP | 08238059 A | * | 9/1996 |
| WO | WO-93/08702 A | * | 5/1993 |
| WO | WO-94/06917 A | * | 3/1994 |
| WO | WO-96/13174 A | * | 5/1996 |

OTHER PUBLICATIONS

Kiefer–Partsch et al., "Purification of an X–Prolyl–Dipeptidyl Aminopeptidase from the Cell Wall of *Lactococcus lactis subsp. cremoris*" (1989) Appl. Microbiol. Biotechnol., vol. 31, pp. 75–78.*

Juillard et al., "The Extracellular P1–Type Proteinase of *Lactococcus lactis* Hydrolyzes beta–Casein into More than One Hundred Different Oligopeptides" (1995) J. Bacteriol., 177(12), 3472–3478.*

Centeno et al., "Some Technological Properties and Enzymic Activities of Strains of Mocrococci Isolated from Raw Cow Milk Cheese" (1996) Microbiol. Aliments Nutr., 14(2), pp. 147–153.*

Sodhi et al., "Tryptic Proteolysis of Raw Cow Milk: Effect of Substrate and Enzyme Concentrations in the Presence and in the Absence of Electrolytes" (1982) Indian J. Dairy Sci., 35(2), pp. 301–307.*

Cousin et al., "Changes in Milk Proteins Caused by Psychrotrophic Bacteria" (1977) Milchwissenschaft, 32(6), pp. 337–341.*

Mills and Thomas, *N.Z. Dairy Sci. Technol.* 13, 209–215 (1978).

Exterkate et al., *Appl. Microbiol. Biotechnol.* 33, 401–403 (1990).

Cavallo, M. et al., *The Lancet* 348, 926–928 (1996).

Exterkate, F., *Applied and Environmental Microbiology* 47(1), 177–183 (1984).

van Beresteijn, E. et al., *J. Allergy Clin. Immunol.* 96(3), 365–374 (1995).

van Beresteijn, E. et al. *Diabetes Care* 19(12), 1364–1369 (1996).

Adler–Nissen, J., *J. Chem Tech, Biotechnol.* 32, 138–156 (1982).

Visser, S. et al., *Journal of Chromatography* 548, 361–370 (1991).

* cited by examiner

Primary Examiner—Jon P. Weber
(74) Attorney, Agent, or Firm—Webb Ziesenheim Logsdon Orkin & Hanson, P.C.

(57) ABSTRACT

A method is presented for producing a casein/caseinate hydrolysate stripped of immunogenic proteins. The method comprises treating an aqueous solution, such as milk, comprising casein/caseinate and immunogenic protein other than casein with a protease that selectively hydrolyzes casein. After the casein/caseinate has been hydrolyzed, the casein/caseinate hydrolyzate is separated by membrane ultrafiltration from unhydrolyzed immunogenic protein and recovered. The resulting hydrolyzate is essentially free of antigenic components of the ABBOS peptide and bovine serum albumin. The casein selective protease is selected from cell wall proteinase of *Lactococcus lactis* subsp. Cremoris Wg2, a *Clostridium histolyticum* collagenase and a *Bacillus polymyxa* dispase.

11 Claims, 7 Drawing Sheets

METHOD FOR THE SELECTIVE DEGRADATION OF MILK PROTEIN IN THE PRESENCE OF OTHER MILK PROTEINS

The present invention relates to a method for the selective degradation of milk proteins, and in particular to a method for the selective hydrolysis of casein and/or casein/caseinate in the presence of at least one further protein constituent other than casein/caseinate.

The invention more in particular relates to such a method wherein the further protein constituent is a milk protein (constituent) other than casein, in particular a whey protein (constituent), and/or to such a method wherein the casein/caseinate and preferably also the at least one further protein constituent are essentially in solution, in particular essentially in an aqueous solution.

According to the method of the invention, the casein/caseinate is specifically degraded in the presence of the at least one further protein constituent, said further protein constituent essentially remaining intact in the process. This allows the casein hydrolysis fragments to be separated, in a further separation step, from the one or more further protein constituents which have essentially remained intact.

The invention is based on the surprising finding that certain proteinases exhibit a very high specificity with respect to casein in the presence of other proteins, in particular in the presence of other milk proteins such as whey proteins. The invention is further based on the use of these specific proteinases in the hydrolysis of casein-containing protein preparations, in particular casein preparations or (aqueous) solutions of milk proteins, such as milk.

The method of the invention can be used, in a first embodiment, for the preparation of a casein hydrolysate which has been stripped of one or more immunogenic protein components other than casein. In a second embodiment, the invention can be used for preparing a milk protein preparation, in particular a whey protein preparation which is essentially stripped of casein/caseinate, starting from a casein-containing milk protein preparation such as milk, whey or a solution of milk or whey proteins. These whey protein preparations stripped of casein likewise have beneficial properties from an immunological point of view.

Figure 6:
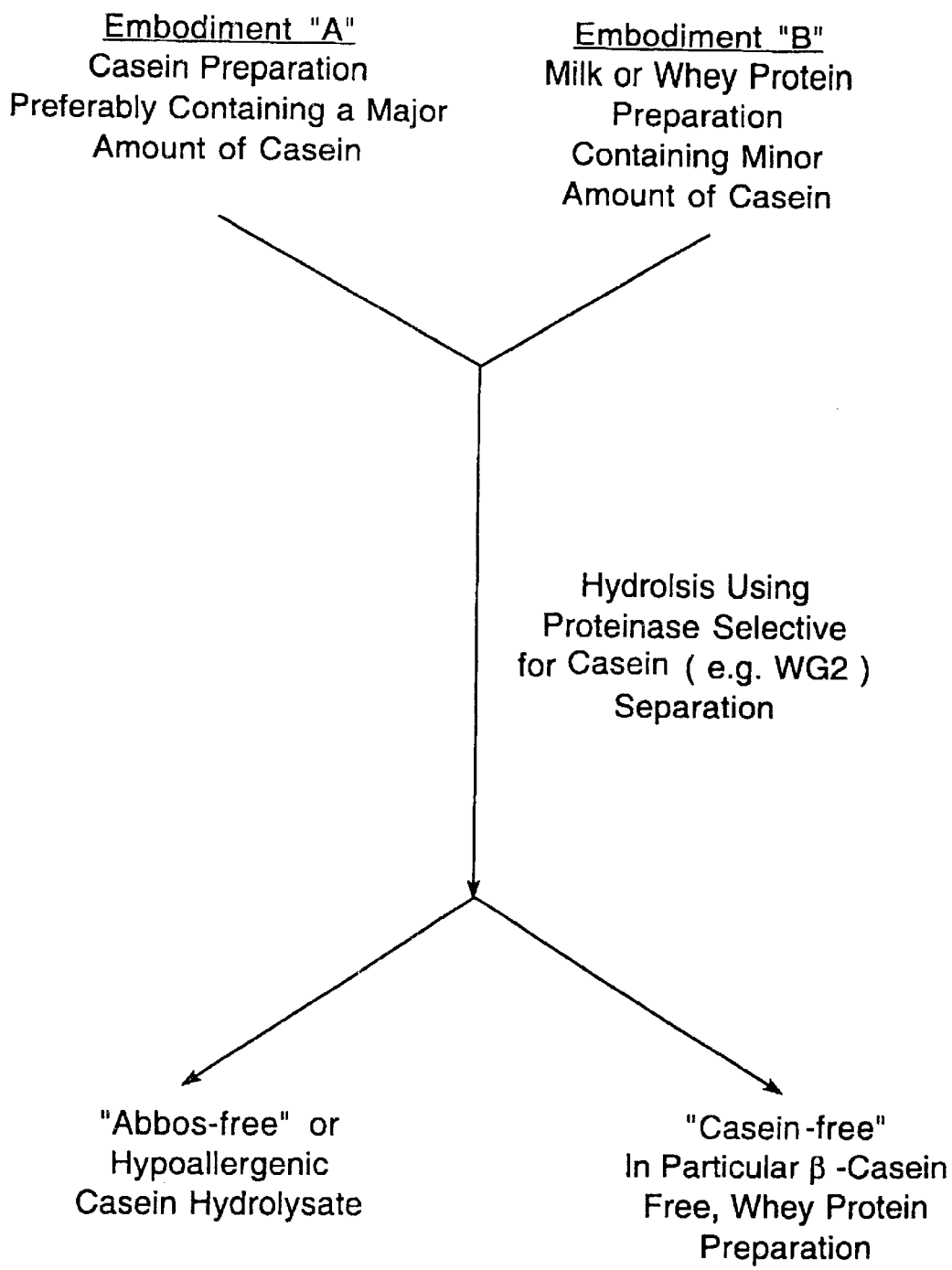

The invention will be further discussed with reference to these specific, non-limiting embodiments "A" and "B", which are schematically shown in FIG. 6. Both embodiments comprise the step of selectively degrading casein in the presence of at least one further proteinaceous component, and separating the hydrolysed fragments from the non-degraded proteins, but differ in the starting material used, the product desired, as well as the intended use and required (immunological) properties of said product, as will become clear hereinbelow.

EP-A-0 250 501 describes a method for producing a whey protein hydrolysate, comprising the steps of:
a) removing casein from the whey protein starting material;
b) hydrolysis of the casein-free protein material obtained in (a) with at least one protease;
c) ultrafiltration of the hydrolysate of (b) using a membrane with a "cut-off" value of no more than 20,000 Dalton;
and optionally further processing of the filtate thus obtained.

In step a), the casein is removed from the whey protein starting material by either physical separation such as precipitation or filtration; or enzymatically by the use of the neutral metalloprotease of *Bacillus subtilis* (Neutrase®, Novo Industrie A/S), which is said to have "a high activity against casein but no or only a weak activity against both native as well as heat-denatured whey proteins".

The enzymatic hydrolysis is carried out at a pH of 4–9, preferably pH 7.5, and a temperature of 30–60° C., preferably 50° C., until "completion", which is said to be a degree of hydrolysis (DH) of about 4%, based upon total protein. The casein fragments are then removed by means of centrifugation or ultrafiltration using—when the whey protein starting material has not been heat-treated—a membrane with a "cut-off" value of no more than 20,000.

Because the molecular weight of the different caseins (19.5–25 kDa) are in the same range as the molecular weights of the native whey proteins α-lactalbumin (14.2 kDa) and β-lactoglobulin (18.2 kDa (monomer)) it is doubtful whether the use of a 20 kDa membrane will lead to the separation of the hydrolysed caseins from the whey proteins.

The "casein-free" whey proteins thus obtained are then further hydrolysed using enzymes such as Alkalase® 2.4 L and Rhozyme P41®, and then ultrafiltrated. According to this disclosure, by selectively removing the casein before the whey proteins are hydrolysed, the final whey protein hydrolysate will have a less bitter taste.

However, the casein depleted whey protein preparation obtained after said step a) is only an intermediate product, and not the end product. Accordingly, no immunological determination of the allergenic properties of this intermediate product is given. In the method of EP-A-0 250 501, this is also not essential, as the proteins obtained are hydrolysed further, after which any still remaining antigenic fragments can be removed by ultrafiltration. However, from the low degree of hydrolysis (4%) in step a), it is expected that at least some antigenic casein fragments will be present in said intermediate product.

EP-A-0 384 303 describes a method for hydrolysing proteins, especially milk proteins and whey proteins, in which a combination of a proteinase preparation from Aspergillus sp. and a bacterial aminopeptidase is used. The use of this combination provides an end product with a less bitter taste, at a higher degree of hydrolysis: with said combination, the "bitter point" is reached at a DH of 4.4%, whereas the bitter point is said to be reached at 1.2% when only the proteinase is used.

EP-A-0 610 411 discloses a method for obtaining a casein hydrolysate, in which a casein or caseinate is suspended in an aqueous medium and hydrolyzised to a DH of 15–35%, preferably 22–28%, using a combination of proteases from the following three groups:
1) one or more neutral endoproteases of a Bacillus (such as Neutrase®);
2) one or more basic endoproteases of Bacillus (such as Alcalase®, Esperase® and Savinase®) and
3) an endoprotease of Aspergillus (such as Novozym® 515).

According to this reference, the use of such a combination of proteases, and hydrolysis to a DH of 15–35% (compared to 4.4% such as disclosed in EP-A-0 250 501 as well as for instance EP-A-0 384 303) provides an improved casein hydrolysate. Nevertheless, no immunological determination of the antigenic properties of the hydrolysate thus obtained is disclosed. Also, the enzymes used are obtained from *Bacillus subtilis*, which is not a food grade microorganism.

EP-A-0 631 731 describes a method for producing a partial hydrolysate of milk protein by enzymatic hydrolysis of a mixture of whey protein and casein to a DH between 4 and 10%. Although a reduction in antigenicity of 80% or more was obtained, according to the examples the resulting hydrolysates still had some residual antigenicity as determined by an ELISA.

EP-A-0 421 309 describes a method for preparing a whey protein hydrolysate free of allergenics by pepsin prehydrolysis, followed by trypsin-chymotwpsin hydrolysis in the presence of a cathionic serine endoprotease of type elastase 2.

Derwent Abstracts AN-96-471202 and AN-94-337356 (corresponding to JP-08238059-A and JP-06261691-A) disclose a method for producing a low-allergenic milk protein preparation, in which alpha-casein is selectively decomposed using a fungus derived protease, in particular from the geni Mucor and Cladosporium.

Derwent Abstract AN-95-307065 (corresponding to JP027203844 A) discloses a method for preparing an emulsified whey protein hydrolysate with good thermo-stability and up to 0.0001 residual antigen in ELISA, obtained by hydrolysing a solution of milk whey protein with a mixture of endotype proteases from *Bacillus subtilis*, trypsin and papain.

EP-A-0 601 802 describes a method for removing allergenic compounds from proteinaceous compositions, in which the protein in said composition is decomposed with proteolytic enzymes into a protein hydrolysate having a degree of hydrolysis of 20–60%, followed by clarification of the hydrolysate thus obtained, preferably by centrifugation or ultrafiltration.

Macropeptides still remaining in the intermediate product thus obtained (which according to Table 2 still contains β-lactoglobuline as shown on ELISA) are then removed using an absorption resin. As the proteolytic enzyme trypsin, pancreatin or microbial proteases such as Alkalase®0.6 L from *Bacillus licheniformis* can be used.

B. Kiefer-Partsch et al., Appl.Microbiol.Biotechnol. (1989) 31:75–78 describes the purification of an X-prolyl-dipeptidyl aminopeptidase from the cell wall proteolytic system of *Lactococcus lactis* sp. *cremoris*. This enzyme is described as a metal-independent, highly β-casein specific protease; reference is made to similar enzymes from *L. lactis* en *Streptococcus thermophillus*. These enzymes are however not used for producing a casein hydrolysate, or specifically removing casein from a whey protein mixture.

A. Preparafion of a Casein Hydrolysate which Has Been Stripped of One or More Protein Constituents Other than Casein This embodiment of the invention relates to the preparation of a casein hydrolysate which has been stripped of one or more immunogenic protein components other than casein.

This embodiment particularly relates to a method for preparing a casein hydrolysate free from ABBOS epitopes, and to the casein hydrolysate free from ABBOS epitopes thus obtained.

An ABBOS epitope is to be understood, hereinafter, as that part of the antigenic ABBOS peptide/fragment of bovine serum albumin (BSA) which reacts with an antibody directed to the ABBOS peptide.

A casein hydrolysate free from ABBOS epitopes is to be understood hereinafter as a casein/caseinate hydrolysate which does not contain any peptides or peptide fragments which may form a bond with antibodies to ABBOS epitope (cross-reaction).

It is known that proteins from cow's milk may give rise, because of their antigenic properties, to immunological reactions, particularly in neonates/infants. These immunological reactions can manifest themselves, for example, as hypersensitivity reactions (cow's milk protein allergy).

One of the immunological reactions against proteins from cow's milk, which has received a great deal of attention in recent years, is the reaction against (epitopes of) bovine serum albumin (BSA) in infants, because of the role played by this immune response in the onset of type I Diabetes Mellitus.

There are indications that, in infants, immunoglobulin G (IgG) antibodies against a specific region of BSA (amino acids 126–144, the so-called ABBOS peptide) can be generated which, under certain conditions, are cross-reactive with the homologous structure in the P69 protein on the surface of pancreatic beta cells. This may give rise to an autoimmune reaction leading to the destruction of the beta cells and consequently to a failure in insulin production.

These findings are based, inter alia, on the fact that the ABBOS epitope is not completely broken down in the digestive tract, even though it contains a large number of possible attack/cleavage sites for the proteolytic enzymes in the gastrointestinal tract. Earlier studies have produced, inter alia, the following results:

in the blood of infants in which diabetes has been diagnosed, antibodies to BSA and in particular to the ABBOS peptide can be detected;

the physiological digestion of BSA proceeds less efficiently in infants than in adults, due to the higher pH in the stomach;

The result is that fragments of BSA containing the intact epitope of the ABBOS peptide are still present after digestion. As in infants, some parts of the mucosal barrier are not yet completely developed and/or harmonized, these large peptide fragments can pass through the intestinal wall and reach the blood stream. These foreign proteins would then stimulate the immune system of the infant to produce antibodies which may possibly be directed against the ABBOS epitope.

Other proteins in cow's milk which may give rise to immunological reactions are, inter alia, α-lactalbumin (α-Lac), beta-lactoglobulin (β-Lg), bovine immunoglobulin G (IgG) and the caseins, as well as antigenic fragments thereof.

In the prior art foods have therefore been developed, in particular for infant formulas, which are based on cow's milk protein which has been degraded/hydrolysed by certain enzymes, resulting in a reduction in the antigenic properties of the milk proteins. Milk protein hydrolysates ("hypoallergenic hydrolysates") for the preparation of such foods are likewise commercially available.

Such hydrolysates are obtained by the treatment of milk protein with proteolytic enzymes (proteinases), leading to the degradation of both the casein and/or the caseinate, which—in terms of protein (determined as dry substance)— forms the main constituent (>80 wt %) of milk proteins, as well as all the other proteins present, including the antigenic proteins and their epitopes.

Studies by the applicant have shown, however, that the commercially available milk protein hydrolysates generally still give cross-reactions and/or exhibit antigenic properties, particularly in specific in vitro immunological assays such as enzyme-linked immunosorbent assay (ELISA). For example, these known hydrolysates still contain BSA fragments which exhibit cross-reactivity with the ABBOS peptide and/or contain intact ABBOS epitopes. Studies by the applicant have demonstrated the presence of these epitopes by means of immunological assay techniques using ABBOS-specific antibodies.

These cross-reactive fragments/immunogenic components could in theory be removed by a higher degree of hydrolysis of the milk protein hydrolysates. This, however, leads to an unduly high level of undesired "free" amino acids in the final product, which are less well absorbed through the intestinal wall and, moreover, may detract from the properties of the product, in particular its consistency and osmolality. The known hydrolysis processes cannot be adequately controlled in this respect.

It is therefore a first object of the invention to provide a milk protein preparation, in particular a casein/caseinate hydrolysate, which has improved immunological properties.

It is a further object of the invention to provide such a preparation which has an acceptably low level of free amino acids.

In particular it is an object of the invention to provide a casein/caseinate hydrolysate in which essentially no antigenic components of the ABBOS peptide are still present/detectable.

Further objectives and advantages of the invention will become clear from the following description.

We have now found that certain proteinases from lactococci exhibit very high specificity to casein/caseinate, i.e. that they degrade the casein/caseinate in milk protein very selectively, whereas the other protein constituents present, with the antigenic epitopes, remain essentially intact.

This surprising finding makes it possible, after prior hydrolysis of the milk protein, for the (relatively) small casein hydrolysis products to be separated, in a simple manner, from the still virtually intact antigenic (whey) proteins, giving a casein hydrolysate which has essentially been stripped of one or more specific antigenic components such as antigenic whey proteins, and in particular of antigenic components of BSA such as the epitope of the ABBOS peptide.

The invention therefore relates, in a first aspect, to a method for preparing a hydrolysed milk protein preparation, starting from a milk protein preparation which comprises more than 80 wt %, preferably more than 90 wt %, of casein/caseinate and at least one further (milk) protein constituent, in which the milk protein preparation is brought into contact with a proteolytic enzyme under conditions for the hydrolysis of the casein/caseinate, characterized in that the casein/caseinate and preferably also the at least one protein constituent are in an essentially dissolved state, and in that the proteolytic enzyme is a proteinase specific for casein/caseinate, such that the casein/caseinate is hydrolysed while the at least one (milk) protein constituent remains essentially intact.

In a further aspect, the invention relates to a method for preparing a milk protein hydrolysate which has been stripped of at least one antigenic protein constituent, starting from a milk protein preparation which comprises more than 80 wt %, preferably more than 90 wt %, of casein/caseinate and the at least one antigenic protein constituent, comprising the steps of:
a. bringing the milk protein preparation into contact with a proteinase specific for casein/caseinate, the casein/caseinate and preferably also the at least one protein constituent being in an essentially dissolved state, such that the casein/caseinate is hydrolysed while the at least one antigenic protein constituent remains essentially intact,
b. separating the casein hydrolysis fragments and the at least one antigenic protein constituent which has remained essentially intact.

In particular, the invention relates to such a method for preparing a hydrolysed casein preparation which does not contain any (antigenic components of) BSA, in particular no (epitopes of the) ABBOS peptide.

The invention further relates to milk protein hydrolysates obtainable according to the method of the invention, in particular to such a hydrolysate which is "free from ABBOS epitopes".

In the description and the claims, protein contents are expressed on the basis of total protein, i.e. in per cent by weight based on the total protein content, in particular determined as dry substance, in the absence of a statement to the contrary.

According to the invention, the casein/caseinate is essentially in solution, preferably in aqueous solution. The at least one further protein constituent, and preferably (virtually) all further protein constituents present, are likewise preferably essentially in solution, more preferably in aqueous solution. The term "essentially in solution" should be understood as customarily used in the dairy industry, i.e. that the constituents in question are virtually entirely dissolved or are virtually entirely in a dissolved state, for example as a suspension of micelles.

This means, incidentally, that there is an upper limit to the casein/caseinate concentration—based on total solution—of the starting material, depending on the solubility of casein in the medium used. In general, the casein concentration will be less than 20 wt % and in particular less than 15 wt %, based on the total composition.

A casein-specific proteinase is to be understood, in particular, as a proteinase which degrades casein selectively in the presence of one or more of the whey proteins α-Lac, β-Lg, BSA and IgG. The selectivity of such proteinases is preferably such that, given equal ratios of enzyme/substrate an within a given time period, the proteinase degrades more than 90% of the intact casein and less than 5% of each of the whey proteins mentioned.

It should be understood, however, that the invention does not exclude the possibility that the antigenic proteins to be removed are cleaved to a lesser extent—albeit much less rapidly than the casein/caseinate—to produce (large) protein fragments, as long as these antigenic protein fragments can be separated from the casein fragments obtained after hydrolysis, the separation taking place, in particular, on the basis of molecular size or molecular mass.

The proteinases (also referred to as proteases) used in the invention preferably are derived from lactococci, more preferably from "food grade" lactococci, or possibly other suitable "food grade" microorganisms. In lactococci the proteinases are present, in particular, on the outside of the cell wall.

Some nonlimiting examples of suitable proteinases, which may or may not be derived from food grade organisms, are the cell wall proteinase of *Lactococcus lactis* subsp. *cremoris*, strain Wg2, collagenase (particularly from *Clostridium histolyticum*) and Dispase, (particularly from *Bacillus polymyxa*) and the like, as well as the variants thereof obtained by recombinant-DNA techniques, if these have the desired substrate specificity.

An example of a commercially available enzyme suitable for use in the invention is Neutrase® (Novo Industri), although this may possibly provide a product with a somewhat more bitter taste and/or may possibly be less selective, compared to the enzymes mentioned above.

Those skilled in the art will be able, on the basis of the present disclosure and/or by means of simple tests for determining the specificity/activity with respect to casein and the further protein constituents of milk protein, to find other suitable proteolytic enzymes, which may be native or recombinant.

While a number of these proteinases and their use in cheese—making have been described in the prior art, their surprising substrate specificity with respect to casein has not previously been reported or utilized.

The proteinases can be used in any suitable form, including enzyme preparations or enzyme isolates—which can be obtained in a manner known per se and/or are commercially available—as well as in immobilized form. Mixtures of more than one proteinase can likewise be used, as long as the desired specificity with respect to casein/caseinate is retained.

Owing to their specificity, the proteinases will in particular cleave/hydrolyse the protein bonds in the casein; in the widest sense, however, the invention is not limited to a specific type of enzymatic reaction.

In a further aspect, the invention relates to the use of the above-described specific proteinases in the conversion of a milk protein preparation which comprises more than 80 wt %, preferably more than 90 wt %, of casein/caseinate and at least one further protein constituent, the casein/caseinate and preferably also the at least one protein constituent being in an essentially dissolved state, preferably in aqueous solution.

The milk protein preparations which are used in the invention, in particular casein preparations or casein-enriched milk or milk protein preparations, are commercially available and/or can be obtained in a manner known per se, starting from (cows') milk or milk products. The invention is however not limited to milk or milk preparations derived from a specific animal. For instance, besides cows' milk, milk from goat, sheep, or any other mammal, or mixtures thereof, can also be used as the starting product.

In addition to casein/caseinate (>80 wt %, preferably >90 wt %), these preparations generally contain further milk proteins such as BSA, α-Lac, β-Lg and IgG, in amounts of less than 20 wt %, in particular less than 10 wt %. However, it will be clear to those skilled in the art that, where appropriate, milk or other protein preparations having low(er) casein levels, for example containing as low as 40 wt % of casein, can also be used, although this may in some applications lead to a lower yield of casein hydrolysate, based on the starting preparation, and consequently a less efficient process.

For instance, the starting product can be a mixture of casein or a casein containing protein preparation, and non-milk proteins, such as soy protein or a soy protein preparation. It is known that soy protein can be used in foods, including infant formulas, to replace animal derived proteins or protein products, in order to reduce the allergenic properties of said food. In such foods, soy protein can also be combined with casein hydrolysates or other milk protein hydrolysates.

Such foods can also be prepared according to the invention, for instance by mixing a casein hydrolysate obtained according to the invention with the desired amount of soy protein and further constituents known per se.

Alternatively, such foods can be prepared by providing a mixture of casein or a casein containing preparation (such as milk or a milk protein preparation) and the soy protein, and selectively hydrolysing the casein in said mixture in situ using a selective proteinase as described herein. If required, any large intact proteins, such as those also described herein, can then be selectively removed. It will be clear to the skilled person that, in this latter embodiment of the invention, the casein concentration in the starting mixture will generally be less than 80%.

Therefore, in a further embodiment, the invention relates to a method—as described herein—for selectively hydrolysing casein in a mixture containing at least one non-milk protein or protein component, such as soy protein, to provide a protein preparation containing at least the non-milk protein and the hydrolysed casein fragments.

Another embodiment of the invention in which the casein concentration in the starting preparation can be less than 80% comprises the use of a starting material comprising a mixture of casein or a casein containing preparation, and milk protien or a milk protein preparation, for instance in an amount of 5–50 wt %, preferably 20–40 wt % of the mixture. Again, in such a mixture, the casein can be hydrolysed selectively in situ using the method described herein, after which optionally undesired peptides can be removed.

The hydrolysis of the milk protein preparation is performed in a manner known per se, under conditions suitable for the desired enzymatic conversion, such as a temperature of 20–40° C., a time of 4–16 hours, and a pH of 6–8, and using known equipment and techniques. In the process, the use of the specific proteinases may additionally provide improved control of the enzymatic conversion.

The hydrolysis is carried out to a suitable extent, i.e. to a degree which allows the hydrolysed fragments to be separated from the nondegraded protein constituents, which is dependant upon factors such as the antigenic components to be removed, the separation method to be used (in particular the molecular cut-off value of the ultrafiltration membrane to be used), and further factors clear to those skilled in the art.

The degree of hydrolysis is preferably such that any subsequent ultrafiltration step can be carried out in a technically/industrially acceptable manner (with respect to filtration rate, yield and the like).

The hydrolysis is terminated before too high a level of "free" amino acids is obtained. The level of free amino acids in the preparation obtained after hydrolysis will, as a rule, be less than 5 wt %.

The progress of the hydrolysis can be monitored, if required, by a suitable technique such as DH (degree of hydrolysis) assay by measuring, for example, the consumption of alkali, or with the aid of the OPA (=O-phthalic anhydride) method, alternatively with the aid of a chromatographic method such as RP-HPCL (reverse-phase high performance liquid chromatography) analysis.

After the hydrolysis, the hydrolysed casein fragments can be separated from the (virtually) intact, nondegraded other proteins or large protein fragments. Any suitable separation method can be used for this purpose, in particular a separation method on the basis of molecular mass and/or molecular size, especially ultrafiltration. This process can advantageously make use of ultrafiltration equipment generally known in the dairy industry, often already present within the dairy industry itself.

In ultrafiltration, use is made of a membrane having a suitable molecular cut-off value, preferably 30 kDa or less, more preferably 10 kDa or less, preferably less than 1 kDa, depending on the size of the antigenic proteins/protein components to be removed.

To obtain a preparation free from ABBOS epitopes, generally a membrane will be used having a molecular cut-off value of 30–10 kDa , IgG (molecular mass 146,000) being removed at the same time. To remove other proteins, in particular smaller immunogenic components such as α-Lac and β-LG, it is possible to use membranes having a molecular cut-off value up to 5 kDa or less.

As a rule, the immunological purity of the hydrolysate will increase the further the caseins are hydrolysed and/or the lower the molecular cut-off value of the membrane used. The ultrafiltration rate (the throughput through the membrane), and also the yield, will likewise depend on the combination of the degree of hydrolysis and the ultrafiltration membrane used.

The immunological purity of the hydrolysate can be assayed by means of a suitable immunological assay, in particular using one or more antibodies which are specific for the antigenic proteins or fragments thereof, and/or the epitopes in question. Suitable techniques such as ELISA and suitable specific antibodies will be known to those skilled in the art and/or can be obtained in a manner known per se.

According to the invention, a hydrolysate is regarded as free from an antigenic component if, using such an immunological assay and in particular ELISA, it is no longer possible to observe/detect any antigenic reaction.

Although the invention allows immunologically highly pure hydrolysates to be obtained, which are essentially free from a more than one, or all, of the immunogenic components present in milk protein, such as BSA/ABBOS, α-Lac and β-Lg and/or IgG, and are even free from immunogenic components/epitopes of the casein/caseinate itself, the method according to the invention is especially suitable and intended for preparing a hydrolysate which is "BSA-free" or "free from ABBOS epitopes".

In the preparation of such a "BSA/ABBOS-free" hydrolysate it is not required given that BSA is a relatively large protein—to hydrolyse to as high a degree as required for the (simultaneous) removal of smaller antigenic proteins such as α-Lac and/or β-Lg. Also, ultrafiltration membranes having a higher molecular cut-off value can be used, as stated above. This has the advantage that the available equipment is less occupied (shorter reaction time for the hydrolysis, better throughput in the ultrafiltration), resulting in a higher production per unit time.

It is therefore not excluded that, in a hydrolysate "free from ABBOS epitopes" according to the invention, (components/epitopes of) other antigenic proteins, in particular smaller one, such as α-Lac and β-Lg, may still be detectable. Likewise it is possible for the preparations of the invention still to contain antigenic components of the casein/caseinate itself.

The casein hydrolysates according to the invention can be further used and/or processed in a manner known per se, for example for the preparation of hypoallergenic foods such as infant formulas and enteral foods, which can be used for preventing and/or treating cow's milk protein allergy, in particular Diabetes Mellitus type I caused by immunological reactions against BSA/ABBOS.

B. Preparing a Whey Protein Preparation Stripped of Casein/Caseinate

The second embodiment of the invention relates to the preparation of a milk protein preparation, in particular a whey protein preparation, which is essentially stripped of casein/caseinate, starting from a casein-containing milk protein preparation, in particular whey or a solution of whey proteins.

More in particular, this embodiment relates to a method for preparing a protein preparation having a reduced casein content and comprising at least one protein constituent other than casein/caseinate, starting from a protein preparation which comprises the at least one protein constituent and casein/caseinate, in which the starting preparation is brought into contact with a proteolytic enzyme under conditions for the hydrolysis of the casein/caseinate, characterized in that the casein/caseinate and preferably also the at least one protein constituent are in an essentially dissolved state, and in that a proteolytic enzyme is a proteinase specific for casein/caseinate, such that the casein/caseinate is hydrolysed while the at least one protein constituent remains essentially intact.

In this embodiment of the invention, a casein-specific proteinase as described above is likewise used, in particular for the specific degradation of the casein/caseinate in the presence of the at least one further protein constituent.

Other than in the above-described embodiment, however, subsequently the one or more further (milk) protein constituents which have essentially remained intact are obtained, instead of the casein hydrolysis fragments.

A casein epitope is to be understood herein as those parts of the casein molecules or casein fragments in the starting material which react with an antibody to casein.

A protein preparation free from casein epitopes is to be understood hereinafter as a protein preparation which does not contain any proteins or protein fragments which are able to form a bond with antibodies to a casein epitope (crossreaction).

Such preparations stripped of casein, casein fragments and/or casein epitopes are important because of their reduced immunological characteristics. Thus, Cavallo et al., The Lancet, 1996; 348:926–928 report that β-casein is possibly involved in insulin-dependant diabetes, since early consumption of cow's milk may cause a specific immune response to β-casein, which cellular and humoral anti-β-casein immune response may produce a cross-reaction with proteins on the pancreatic beta cell, inter alia because of the high homology between the sequences of β-casein and various beta cell molecules. In this respect, milk protein preparations stripped of casein may play an important part in the preparation of non-immunogenic infant formulas.

The present embodiment of the invention generally comprises the following steps:

a. bringing the protein preparation, which comprises the at least one desired protein constituent and casein/caseinate, into contact with a proteinase specific for casein/caseinate, such that the casein/caseinate is hydrolysed while the desired protein constituent remains essentially intact, b. separating the casein hydrolysis fragments from the desired protein constituent which has essentially remained intact.

This embodiment of the invention can be used for the selective removal of casein/caseinate from casein-containing protein preparations, to provide a protein preparation stripped of casein, the selective removal of even low to very low casein levels being possible in the process.

This embodiment can be used, in particular, to remove casein from milk or a solution of milk proteins, and in particular from whey or a solution of whey proteins.

The casein level of the starting preparation will, as a rule, be at least 0.1 wt %, in particular 1 wt % or more, although even lower amounts of casein can also be selectively removed. The upper limit for the casein content is not essential, although in practice the casein content in the starting material may generally be less than 50% by weight, preferably less than 20% by weight, more preferably less than 10% by weight.

The hydrolysis step is essentially performed as described above for embodiment a, using the same casein-specific proteinases. Any adaptations required, depending on the starting preparation used, will be evident to those skilled in the art, also drawing on the present description.

The degree of hydrolysis will preferably be such that after completion of the hydrolysis step, more than 90%, more preferably to more than 99%, and most preferably essentially all casein present in the starting preparation has been cleaved into smaller fragments. The level of still intact casein molecules after the hydrolysis step is preferably less than 0.1 wt % or more preferably less than 0.01 wt %.

The hydrolysis is preferably carried out to such a degree that the level of antigenic casein hydrolysis fragments (including any uncleaved/intact casein) is less than 1 wt %, preferably less than 0.1 wt %.

According to a particular embodiment, the protein preparation obtained after hydrolysis and containing the casein hydrolysis fragments, is already free from casein epitopes, which means that the casein and/or the (antigenic) fragments thereof have been cleaved to such a degree that casein epitopes can no longer be detected in suitable immunological assays, such as ELISA, using casein-specific antibodies.

However, as a rule, such extensive hydrolysis is not required to obtain a protein preparation free from casein epitopes, since any small antigenic casein hydrolysis fragments still present can likewise be removed in the course of a subsequent separation step, as described below.

It will also be clear to those skilled in the art that this embodiment can be used not only to remove/separate off intact casein molecules but also to remove/separate off casein fragments, in particular antigenic casein fragments.

To separate off the casein fragments obtained by hydrolysis, any suitable separation method can be used, a separation method on the basis of molecular mass and/or molecular size again being preferred. In particular, ultrafiltration or a similar technique can be used, the desired fraction not being the permeate (as in embodiment a. above) but the retentate which will contain the one or more desired protein constituents.

In ultrafiltration, a membrane having a suitable molecular cut-off value is used. Dependent upon said cut-off value, solely the casein hydrolysis fragments can be separated off, or—by using a suitably higher cut-off value—simultaneously one or more of the small(er) further protein constituents, which have remained intact, can also be removed.

The removal of essentially only the casein hydrolysis fragments will generally involve the use of a membrane having a molecular cut-off value of 10 kDa or less, depending on the degree of hydrolysis.

The degree of hydrolysis and the molecular cut-off value of the ultrafiltration membrane used are preferably chosen such that the level of (antigenic) casein hydrolysis fragments and/or casein epitopes in the retentate obtained after ultrafiltration is less than 0.1 wt %, preferably less than 0.01 wt%.

Most preferably, the degree of hydrolysis and the molecular cut-off value are chosen such that all antigenic casein hydrolysis fragments and/or casein epitopes can be separated off, so that it is no longer possible to detect, by means of suitable immunological assays using casein-specific antibodies, such as ELISA, any epitopes of casein in the protein preparation obtained after ultrafiltration. Such a preparation is here referred to as "free from casein epitopes".

If the starting material is milk, whey or a solution of milk proteins or whey proteins, what is obtained after the casein hydrolysis fragments have been separated off will generally be a mixture of proteins. This mixture may be further separated according to methods known per se, to obtain the separate protein constituents in purified or essentially pure form. This can be done, for example, by precipitation, chromatographic techniques, or by further separation on the basis of molecular mass or molecular size. It is thus possible, by successive ultrafiltration steps with increasing molecular cut-off values of the membrane, to achieve fractionation of the milk proteins.

This embodiment of the invention can be used, in particular, to obtain milk protein preparations, in particular preparations comprising one or more whey proteins such as α-Lac, β-Lg, BSA and IgG. However, this embodiment can also be used for purifying or isolating proteins not native to natural milk, starting from a casein-containing medium. All these protein preparations are preferably free from casein epitopes, as defined above.

The (whey) protein preparations thus obtained, in particular the preparations free from casein epitopes, can be used for preparing food preparations such as infant formula, for preventing immunological reactions against casein, in particular β-casein.

With respect to the invention it is further noted that it differs from the action of bacterial proteinases during the maturation of cheese—which is outside the scope of the invention—in that the casein/caseinate, and preferably also the further protein constituents, during the hydrolysis are in solution, which may or may not be concentrated and will generally be aqueous; in cheese-making, the casein-cleaving enzymes act on the precipitated casein in the curd.

Moreover, the cleavage of casein in the cheese milk takes place under the influence of a specific enzyme (a curdling enzyme such as chymosin). The action, and particularly the specificity, of the proteinases used according to the invention differ demonstrably, however, from that of such curdling enzymes. Thus, according to one aspect of the invention, the specific action of chymosin on casein, in particular with respect to the cleavage of the phenylalanine/methionine bond, is disclaimed, even though the invention in the widest sense is not limited to a specific type of enzymatic reaction.

Although the invention has been described above with respect to two different embodiments, it should be understood that these embodiments can also be combined in that, after the specific hydrolysis of the casein/caseinate-containing (milk) protein preparation, both the casein hydrolysis fragments and the proteins which have remained intact are obtained as two separate fractions by means of a suitable separation technique as described above. These fractions can then be further processed and/or used in the above-described manner. Other adaptations and uses of the teachings of the invention, which are within the scope of the following claims, will be obvious to those skilled in the art.

Figure 1:
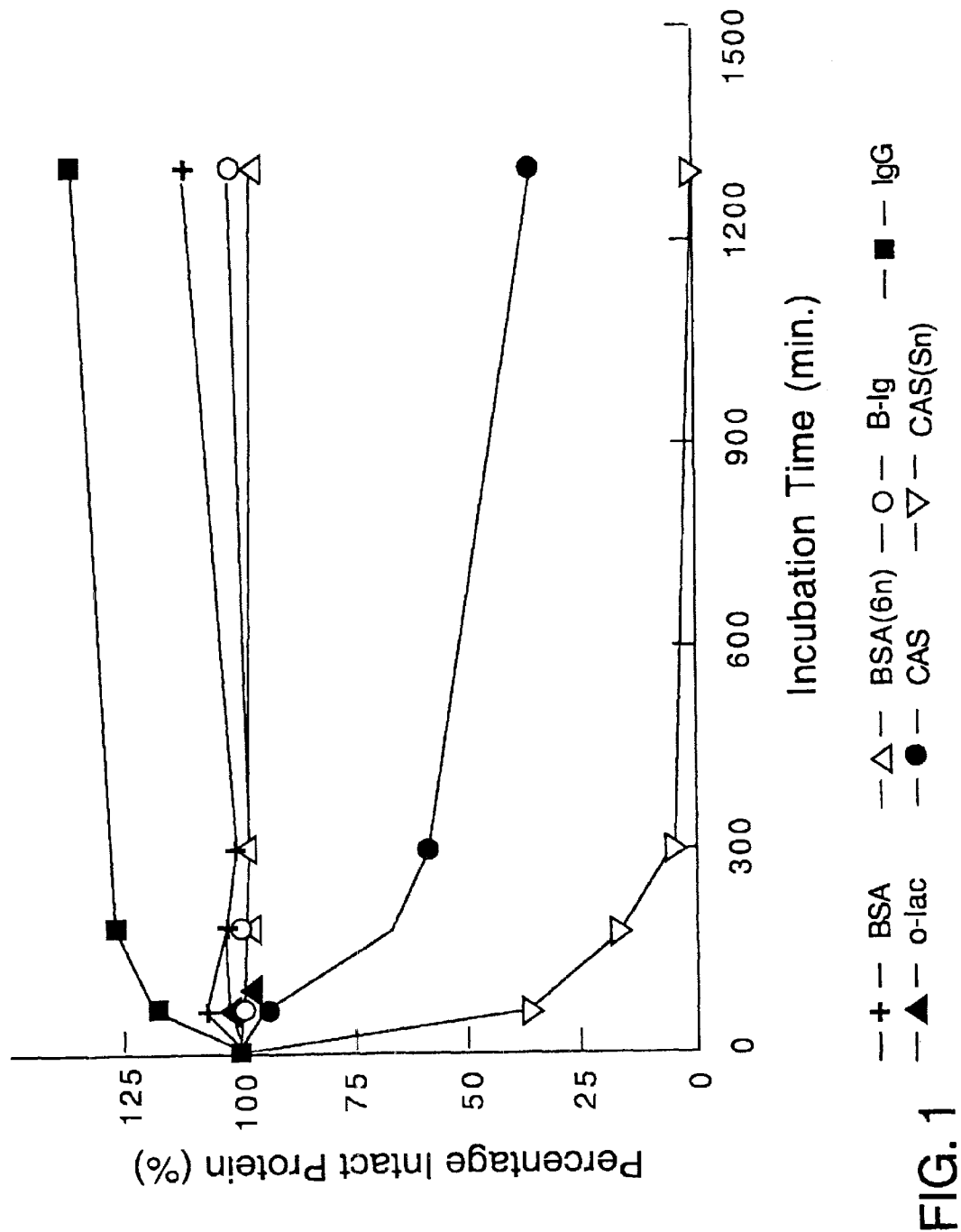

The invention will be explained below with reference to the present, nonlimiting example and the appended figures showing the following:

FIG. 1: Degradation of the various milk proteins during incubation with proteinase Wg2 (15 units/mg protein) expressed as percentage intact protein. (+) BSA; (Δ) BSA (90 units/mg protein); (○) βLg; (■) IgG; (▲) αLa; (●) total casein; (▽) total casein (90 units/mg protein).

Figure 2:
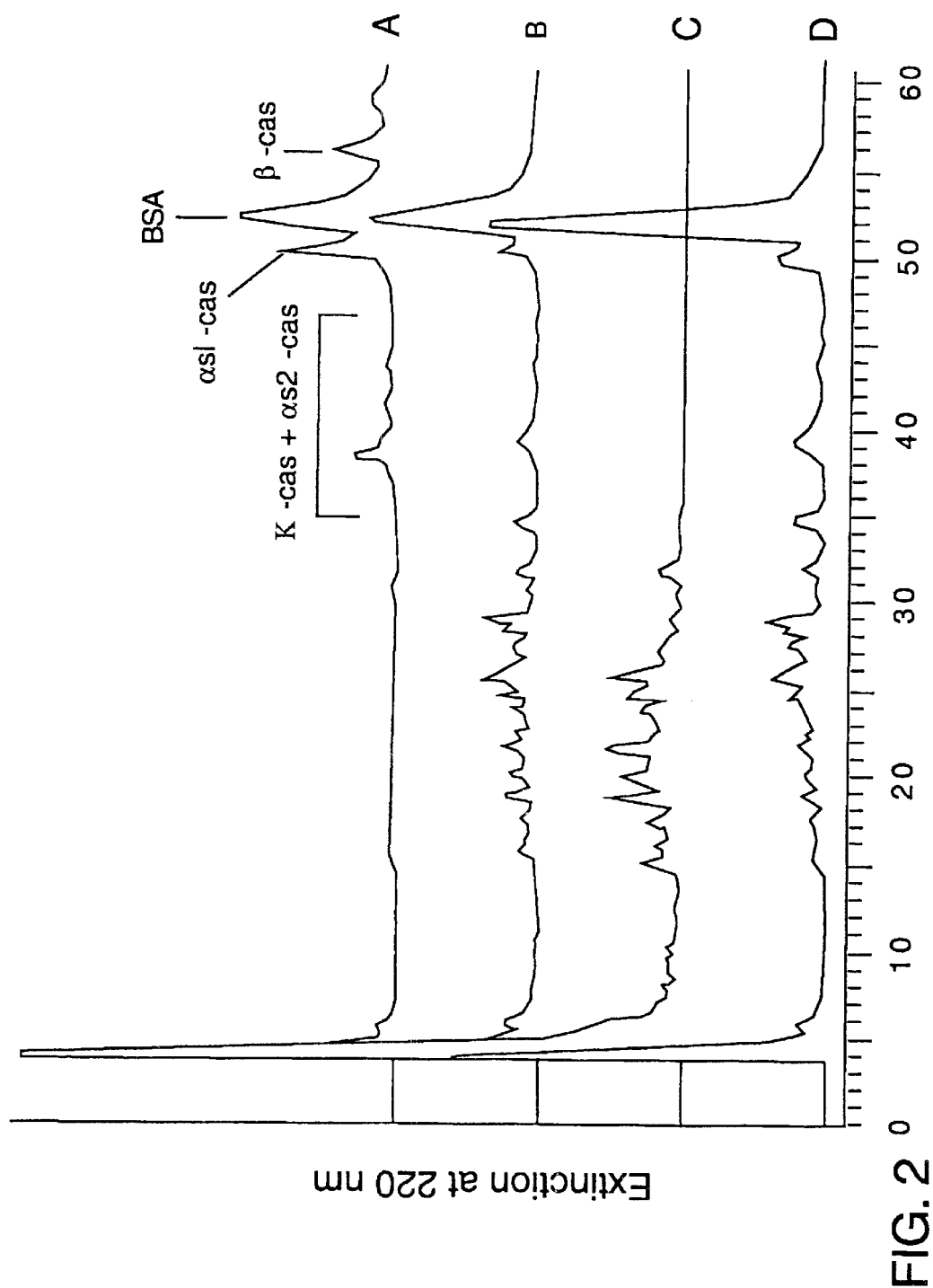

FIG. 2: RP-HPLC analysis of hydrolysates in which a mixture of total casein and BSA was hydrolyzed with proteinase Wg2 (90 units/mg protein). Intact BSA and casein fragments were subsequently separated by means of ultrafiltration (cut-off value 30 kDa ); (A) Mixture of casein and BSA, t=0 hours; (B) Mixture of casein and BSA, t=22 hours; (C) 30 kDa permeate fraction of the t=22 hours hydrolysate; (D) 30 kDa retentate fraction of the t=22 hours hydrolysate.

Figure 3:
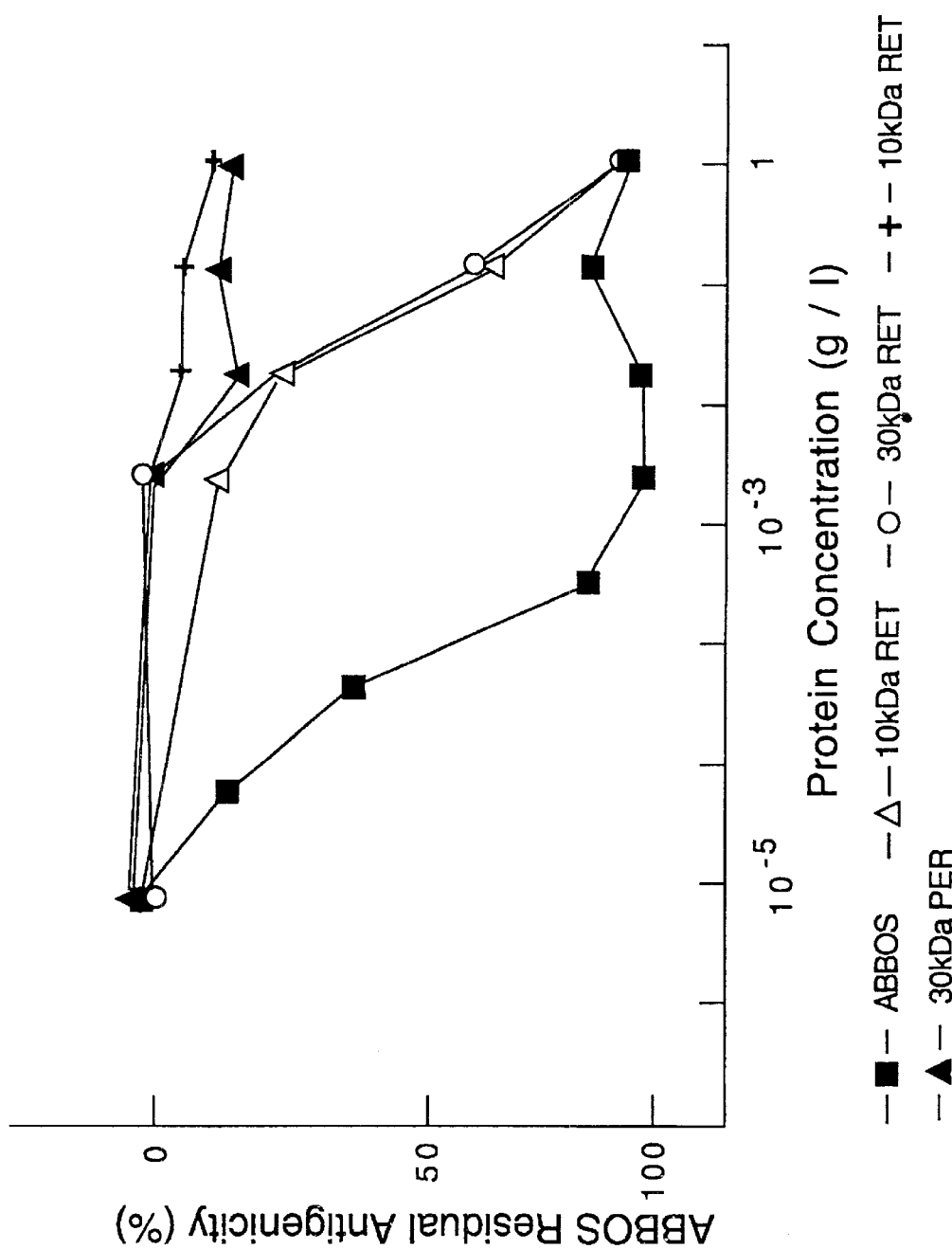

FIG. 3: ABBOS residual antigenicity of retentate and permeate fractions obtained after ultrafiltration (cut-off values 10 and 30 kDa ) of a mixture of total casein and BSA hydrolyzed with proteinase Wg2 (90 units/mg protein); (■) synthesized ABBOS-peptide; (Δ) 10 kDa retentate; (○) 30 kDa retentate; (+) 10 kDa permeate; (▲) 30 kDa permeate.

Figure 4:
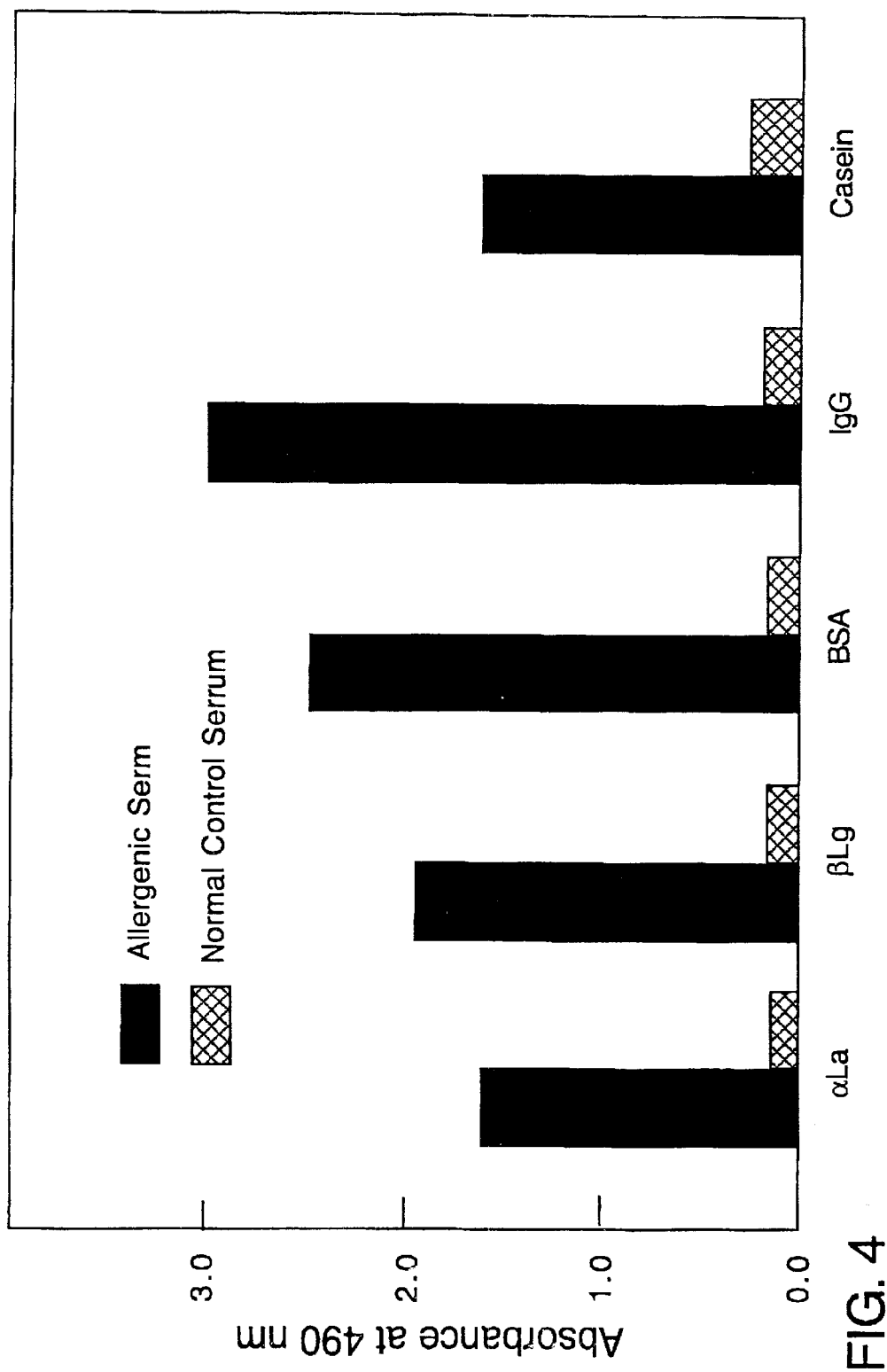

FIG. 4: Specific IgE binding to casein and the whey proteins of sera from patients with cow milk allergy and persons not allergic to milk proteins.

Figure 5A:
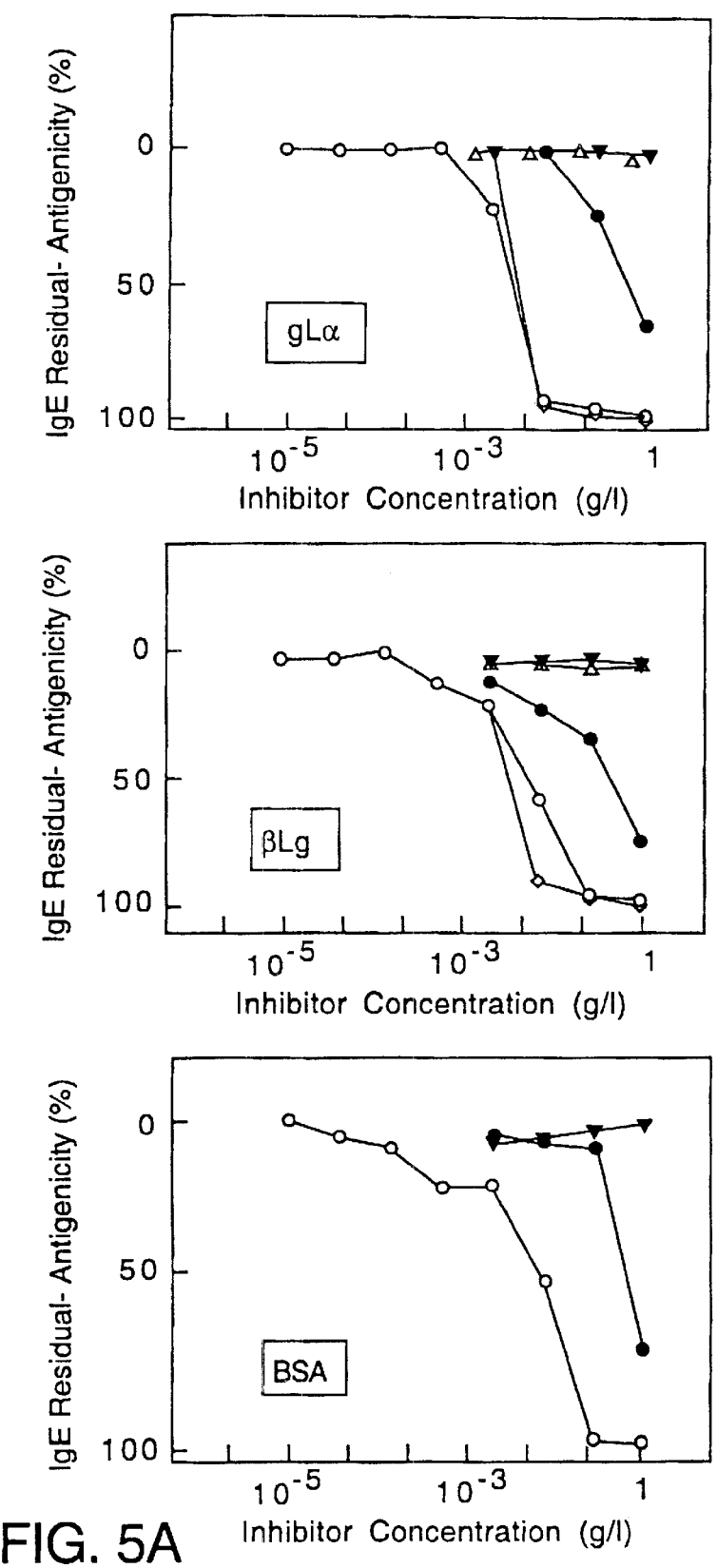
Figure 5B:
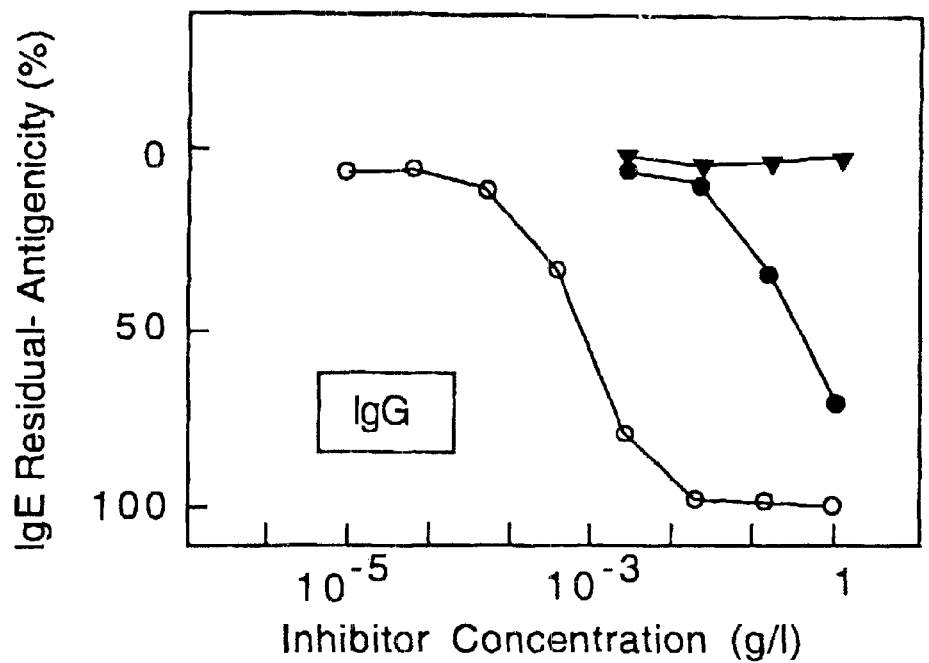
Figure 5B:
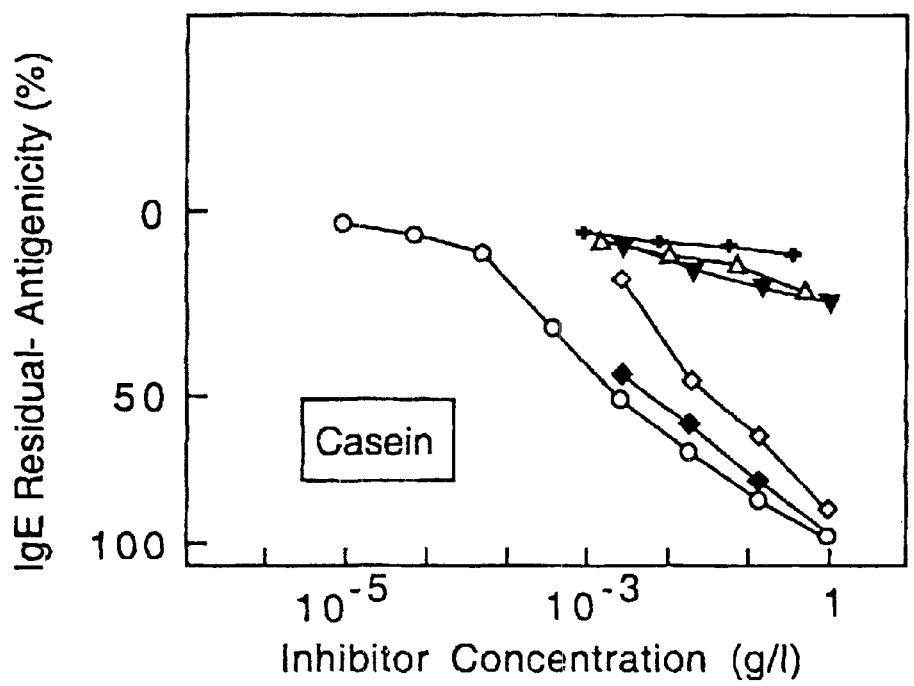

FIG. 5: IgE residual antigenicity of retentate and permeate fractions obtained after ultrafiltration (cut-off value 3 and 5 kDa ) of a mixture of casein, α-lactalbumin, β-lactoglobuline or of sodium caseinate hydrolyzed with proteinase Wg2 (90 units/mg protein); (○) intact milk protein: upper row from left to right αLa, βLg and BSA, lower row from left to right IgG and casein; (◇) 5 kDa retentate of mixture casein, αLa and βLg; (●) 5 kDa retentate of sodium caseinate; (△) 5 kDa permeate of mixture casein, αLa and βLg; (t) 5 kDa permeate of sodium caseinate; (+) 3 kDa permeate of mixture casein, αLa and βLg.

FIG. 6: Schematic representation of embodiments "A" and "B" of the invention.

EXAMPLE a. Preparation and Purification of the Proteinase

The organism *Lactococcus lactis* subsp. *cremoris* strain WG2 (collection Netherlands Institute for Dairy Research B1021) was grown (overnight at 30° C.; final pH 4.6–4.8) in milk and stationary-phase cells were subsequently harvested as described by Exterkate in Appl. Environ. Microbiol. 47:177–183 (1990). Essentially according to Mills and Thomas in N. Z. J. Dairy Sci. Technol. 13:209–215 (1978) the lactococcal cell envelope proteinase Wg2 (proteinase Wg2) was autoproteolytically released by incubating the cells in a calcium-free buffer at 30° C. (20 mM imidazole-HCl buffer pH 6.4). After incubating, the cells were sedimented by centrifugation (15 min at 15,000 g). Supernatant fractions were pooled, extensively washed with the same buffer supplemented with 10 mM $CaCl_2$ and concentrated. For further purification the crude proteinase Wg2 concentrate was centrifuged (30 min at 48,000 g), filtered (0.45 μm) and applied onto a MonoQ HR 10/10 (Pharmacia, Uppsala, Sweden) anion-exchange column, equilibrated with 20 mM imidazole-HCl buffer (pH 6.4) supplemented with 10 mM $CaCl_2$. After elution of non-binding material, proteins were eluted at 2 ml/min with a 0–0.3 M NaCl gradient in the same buffer. Fractions containing the enzyme activity, and without activity of the intracellular exopeptidase PepN, were pooled, concentrated, aliquotted and stored at −20° C. Before use, the enzyme activity of the lactococcal proteinase Wg2 was quantified and contamination with the intracellular exopeptidase PepN was tested using two different chromogenic substrates: S-2586 and Lys-pNA, respectively as described by Exterkate et al in Appl. Microbiol.Biotechnol. 33:401–403 (1990). One proteinase unit represents the formation of 1 nmol p-nitroanilide per minute at 30° C.

b. Hydrolysis Experiments

Two different series of hydrolysis experiments were performed. In the first series the various milk proteins, total casein, αLa, βLg, BSA or IgG were separately dissolved in 50 mM imidazole-HCl buffer (pH 6.5) for the incubation with the proteinase Wg2. The final protein concentration was 10 mg/ml, the enzyme activity 15 or 90 units/mg protein and the temperature 30° C. Aliquots of 20 μl were taken out of the incubation vessels at 0, 1, 3, 5 and 22 hours after the addition of lactococcal proteinase Wg2.

In the second series of hydrolysis experiments commercially available sodium caseinate and a mixture of equal amounts of total casein, αLa and βLg (on a protein basis) were dissolved in 50 mM imidazole-HCl buffer (pH 6.5) and offered as a substrate for the proteinase Wg2. The total protein concentration was 6 mg/ml and the enzyme activity 90 units/mg protein. After hydrolysis for 22 hours at 30° C., the hydrolysates were ultrafiltered, using membranes (Omega-type, Filtron, Northborough, Mass., USA) with cutoff values ranging from 3 to 30 kDa.

Because BSA became insoluble in the imidazole-HCl buffer after heating, necessary to expose the ABBOS epitope for immunological detection (see below), a mixture of equal amounts of total casein and BSA was dissolved in distilled water and hydrolyzed using the pH-stat technique as described by Adler -Nissen J. Chem. Tech Biotech. 32:138–156 (1982). During the hydrolysis with proteinase Wg2 the pH was kept constant at pH 7.0 by the addition of 0.05 M NaOH. The total protein concentration was 4 mg/ml and the enzyme activity 90 units/mg protein. After hydrolysis for 22 hours at 30° C., the hydrolysates were ultrafiltered, using membranes (Omega-type, Filtron, Northborough, Mass., USA) with cut-off values ranging from 3 to 30 kDa.

c. Physicochemical and Immunological Characterization of the Hydrolysates

To follow the degradation of the milk proteins during hydrolysis RP-HPLC as described by Visser et al. in J. Chromatogr.548:361–370 (1991) was applied. The decrease of the intact-protein peak areas was quantitated by integration (Turbochrom, Perkin Elmer Co., Cupertino, Calif., USA). The occurrence of cross-reactivity between the ABBOS peptide and the various proteinase Wg2 hydrolysates was determined by competitive enzyme-linked immunosorbent assay (ELISA), using rabbit anti-ABBOS serum as described by van Beresteijn and Meijer in Diabetes Care 19:1364–1369 (1996). In order to expose the ABBOS epitope, hydrolysates were heated for 5 min at 95° C. The same method was applied to determine the presence of cross-reactive milk-protein-specific IgE antibodybinding sites in the various proteinase Wg2 hydrolysates as described by van Beresteijn et al. in J. Allergy Clin Immunol. 96:365–374 (1995) using a human antiserum from cow milk alllergic patients with high IgE antibody titers to all individual milk proteins (FIG. 4).

d. Results

Enzyme Specificity

The specificity of the lactococcal proteinase Wg2 for the various milk proteins is shown in FIG. 1. Degradation of protein under the chosen conditions was only detectable when total casein was used as a substrate; the whey proteins αLa, βLg, BSA and IgG remained intact. The apparent increase in RP-HPLC peak area for IgG (FIG. 1) cannot be explained, but may be connected with the observed insolubilization of IgG after thawing of the hydrolysate samples. Increasing the enzyme concentration to 90 units/mg protein total casein was degraded within 5 hours (FIG. 1).

Separation of Casein and Whey Protein(s)

The discriminating behaviour of proteinase Wg2 leading to the specific degradation of casein in the presence of the whey proteins (αLa, βLg, BSA and IgG) caused an increased difference in molecular weight between the smaller casein fragments and the still-intact whey proteins. Dependent on the cut-off value of the membrane, specific removal of intact whey proteins from the casein fragments was possible. Membranes with cut-off values up to 30 kDa selectively removed BSA from a mixture of total casein and BSA or from a commercially available sodium caseinate (generally contaminated with whey proteins) after treatment with proteinase Wg2. FIG. 2 shows the specific degradation of total casein by proteinase Wg2 in the presence of BSA with subsequent removal of the intact BSA using a 30 kDa membrane.

Residual ABBOS Antigenicity

RP-HPLC analysis could not detect BSA or fragments thereof in permeate fractions obtained after hydrolysis of a mixture of total casein and BSA or sodium caseinate with proteinase Wg2 followed by ultrafiltration (FIG. 2). Using the more sensitive immunological method these results were confirmed. FIG. 3 shows that the rabbit anti-ABBOS serum did not show any binding inhibition with the permeate fractions up to an inhibitor concentration of 1 g/l. In contrast, the retentate fractions and the control (synthesized ABBOS peptide) showed 100% inhibition at that protein concentration.

Residual IgE Antigenicity

Treatment of a mixture of total casein, αLa and βLg or of sodium caseinate with proteinase Wg2 followed by ultrafiltration through membranes with lower cut-off values (5 kDa or 3 kDa) addditionally removed the lower molecular weight antigenic whey proteins. FIG. 5 shows typical examples of the inhibition ELISA for βLg, αLa, BSA, IgG and total casein for these hydrolysates. The human antiserum did not show any IgE binding inhibition with the permeate fractions up to an inhibitor concentration of 1 g/l. In contrast, the retentate fractions and the respective intact milk protein showed 100% inhibition at that protein concentration.

What is claimed is:

1. A method for producing a casein/caseinate hydrolysate that is stripped of immunogenic protein other than casein/caseinate, the method comprising the steps of:
   a) providing an aqueous solution containing essentially dissolved casein/caseinate and an essentially dissolved immunogenic protein other than casein/caseinate;
   b) adding to the aqueous solution a casein-specific proteolytic enzyme;
   c) incubating the aqueous solution and the casein-specific proteolytic enzyme under conditions such that the casein/caseinate is hydrolysed while the immunogenic protein other than casein/caseinate remains essentially intact;
   d) separating the hydrolysed casein/caseinate and the essentially intact immunogenic protein other than casein/caseinate; and
   e) recovering the hydrolyzed casein/caseinate stripped of immunogenic protein.

2. The method of claim 1, wherein the immunogenic protein other than casein/caseinate is a whey protein.

3. The method of claim 2, wherein the whey protein is bovine serum albumin.

4. The method of claim 3, wherein essentially no detectable antigenic components of the ABBOS peptide are present in the casein/caseinate hydrolysate.

5. The method of claim 4, wherein essentially no detectable antigenic components of bovine serum albumin are present in the casein/caseinate hydrolysate.

6. The method of claim 1, wherein the aqueous solution is selected from the group consisting of milk, a fraction of milk, and an aqueous solution of milk proteins.

7. The method of claim 1 wherein the casein-specific proteolytic enzyme is selected from the group consisting of a Lactococcus cell wall proteinase, a collagenase and a dispase.

8. The method of claim 1, wherein the casein-specific enzyme is selected from the group consisting of a cell wall proteinase of *Lactococcus lactis* subsp. *cremoris* strain Wg2, a *Clostridium histolyticum* collagenase and a *Bacillus polymyxa* dispase.

9. The method of claim 1, wherein the separation in step (d) uses a separation method based on a characteristic selected from the group consisting of molecular mass and molecular size.

10. The method of claim 9, wherein the separation method is ultrafiltration.

11. The method of claim 10, wherein the ultrafiltration uses a molecular cut-off value in the range of 10–30 kDa.

* * * * *

UNITED STATES PATENT AND TRADEMARK OFFICE
CERTIFICATE OF CORRECTION

PATENT NO.   : 6,451,552 B1                                              Page 1 of 1
DATED        : September 17, 2002
INVENTOR(S)  : Van Beresteijn et al.

It is certified that error appears in the above-identified patent and that said Letters Patent is hereby corrected as shown below:

<u>Title page,</u>
Prior to "Subject to any disclaimer" please insert -- This patent issued on a continued prosecution application filed under 37 CFR 1.53(d), and is subject to the twenty year patent term provisions of 35 U.S.C. 154(a)(2). --

<u>Column 1,</u>
Line 60, "the filtate" should read -- the filtrate --.

<u>Column 6,</u>
Line 25, "an within" should read -- and within --.

<u>Column 8,</u>
Line 3, "milk protien" should read -- milk protein --.

<u>Column 9,</u>
Line 19, "required given" should read -- required--given --.

<u>Column 12</u>
Lines 56 and 65, "kDa )" should read -- kDa) --.

<u>Column 14,</u>
Line 23, "milk-protcin-specific" should read -- milk-protein-specific --.

<u>Column 15,</u>
Line 5, "kDa )" should read -- kDa) --.

Signed and Sealed this

Eleventh Day of March, 2003

JAMES E. ROGAN
*Director of the United States Patent and Trademark Office*